United States Patent [19]

Mogensen

[11] Patent Number: 5,312,806
[45] Date of Patent: May 17, 1994

[54] MINERAL FIBRES

[75] Inventor: Gurli Mogensen, Lynge, Denmark

[73] Assignee: Rockwool International A/S, Hedehusene, Denmark

[21] Appl. No.: 916,145

[22] PCT Filed: Feb. 1, 1991

[86] PCT No.: PCT/DK91/00030
§ 371 Date: Jul. 31, 1992
§ 102(e) Date: Jul. 31, 1992

[87] PCT Pub. No.: WO91/11403
PCT Pub. Date: Aug. 8, 1991

[30] Foreign Application Priority Data

Feb. 1, 1990 [DK] Denmark .............. 0269/90

[51] Int. Cl.⁵ .............................. C03C 13/06
[52] U.S. Cl. .......................... 501/36; 501/38
[58] Field of Search .......... 501/36, 38, 70, 73

[56] References Cited

U.S. PATENT DOCUMENTS 2,674,539  6/1954  Harter et al. .
2,710,261  6/1955  McMullen .
3,679,443  7/1972  Mechel et al. .
4,026,715  5/1977  Erickson et al. ............ 501/38
4,240,833 12/1980  Myles .
4,461,840  7/1984  Massol et al. ............... 501/36
4,720,295  1/1988  Bronshtein ................ 501/36 X

FOREIGN PATENT DOCUMENTS

5453/87   10/1987  Denmark .
1075295    2/1960  Fed. Rep. of Germany .
1596842    9/1975  Fed. Rep. of Germany .
145467    12/1981  Netherlands .
8406571-3 12/1984  Sweden .

Primary Examiner—Karl Group
Attorney, Agent, or Firm—Watson, Cole, Grindle & Watson

[57] ABSTRACT

Mineral fibers that include, by weight, 34–42% $SiO_2$, 31–38% $Al_2O_3$, 0–1% $TiO_2$, 2.5–7.5% FeO, 17–21% CaO, 0.5–43% MgO, 0.3–1.5% $Na_2O$ and 0.1–2.3% $K_2O$ display very high temperature resistance.

2 Claims, No Drawings

MINERAL FIBRES

BACKGROUND OF THE INVENTION

The present invention relates to mineral fibres which are resistant at high temperatures, and in particular high-temperature resistant mineral fibres for use in thermal insulation, e.g. in energy intensive furnaces.

THE PRIOR ART

Fireproof ceramic fibres are known which consist substantially of a major amount of $SiO_2$ and $Al_2O_3$, and optionally a minor amount of a further component, and which has a maximum temperature of use (MTU) of about 1500° C. or more, cf. U.S. Pat. Nos. 4,240,833, 2,674,539 and 2,710,261, DE laid open patent applications Nos. 1,075,295 and 1,596,842 and NO laid open patent application No. 145,467. Such fibres are manufactured from a melt composed of a mixture of $SiO_2$ and $Al_2O_3$, and since this mixture does not melt until at a temperature of 1600°–1900° C. is reached the formation of the melt requires an electric furnace. As such, the costs associated with the manufacture of these fibres are relatively high.

Mineral fibres are another kind of fibres and they consist of a mixture of the following oxides: $SiO_2$, $Al_2O_3$, FeO or $Fe_2O_3$, CaO, MgO and $R_2O$ wherein R is Na and K. Examples of such mineral fibres are rock wool fibres which typically have an MTU of up to 750° C. and which may be manfactured at relatively low costs in coke-heated shaft furnaces.

There is a need to provide low-cost mineral fibres having a somewhat higher MTU than ordinary rock wool fibres, viz. having an MTU of up to 850° C.

DK patent application No. 5453/87 discloses inorganic fibres having an MTU of up to 815° C. and having the following composition:

| | |
|---|---|
| $SiO_2$: | 55–64% by weight |
| $Al_2O_3$: | 0–10% by weight |
| CaO: | 29–44% by weight |
| MgO: | 0.1–30% by weight |

Also, SE patent application No. 8406571-3 describes inorganic fibres having a higher MTU than that of ordinary rock wool fibres, viz. an MTU of up to 800° C. These known fibres are manufactured from a chlorite-containing raw material which contains chlorite in an amount of more than 35%, preferably 40–45%, and has an iron oxide content of between 5 and 20%, preferably between 10 and 15%. The known fibres which may for instance have the following composition:

| | |
|---|---|
| $SiO_2$: | 40.9% |
| $Al_2O_3$: | 14.7% |
| FeO: | 5.3% |
| $Fe_2O_3$: | 8.3% |
| CaO: | 10.2% |
| MgO: | 6.8% |
| $K_2O + Na_2O$: | 3.3% |
| MnO: | 0.25% |
| $TiO_2$: | 3.0% | suffer from the drawback that the colour of the fibres is very dark due to the relatively high from oxide content.

It is the object of the present invention to provide mineral fibres having an MTU which is substantially higher than the MTU of conventional rock wool fibres and which can be manufactured in conventional plants for the manufacture of rock wool fibres and which are not associated with the above-mentioned drawback.

SUMMARY OF THE INVENTION

This object is obtained with the mineral fibres of the invention, which have the following composition:

| | |
|---|---|
| $SiO_2$: | 34–42% by weight |
| $Al_2O_3$: | 31–38% by weight |
| $TiO_2$: | 0–1% by weight |
| FeO: | 2.5–7.5% by weight |
| CaO: | 17–21% by weight |
| MgO: | 0.5–4.3% by weight |
| $Na_2O$: | 0.3–1.5% by weight |
| $K_2O$: | 0.1–2.3% by weight |

This composition is characterized in having a high content of $SiO_2$ and $Al_2O_3$ which provides an increased temperature resistance. The FeO content ensures that a sufficient amount of seed crystal forming agents is present, which is essential to the behaviour of the fibres at temperatures above the crystallization temperature. FeO and CaO reduces the viscosity to a suitable level. The MgO content is kept at a low level as the CaO content is high; thereby a melting temperature minimum which occurs when the MgO and CaO contents are within the same range is avoided.

It has been found that the fibre product according to the invention is not only resistant to a temperature which is about 100° C. higher than that of a corresponding product of rock wool fibres, but the setting is also substantially less (about 30% relative to about 45%) at temperatures above the maximum temperature of use. It is noted that the relevant fibre product according to the invention has the following composition:

| | |
|---|---|
| $SiO_2$: | 36.8% by weight |
| $Al_2O_3$: | 33.9% by weight |
| $TiO_2$: | 0.88% by weight |
| FeO: | 4.4% by weight |
| CaO: | 19.5% by weight |
| MgO: | 2.6% by weight |
| $Na_2O$: | 0.5 |
| $K_2O$: | 1.7 |

The following is a particularly preferred composition for the mineral fibres according to the invention:

| | |
|---|---|
| $SiO_2$: | 36–40% by weight |
| $Al_2O_3$: | 33–35% by weight |
| $TiO_2$: | 0.6–0.9% by weight |
| FeO: | 3.5–6.5% by weight |
| CaO: | 18–20% by weight |
| MgO: | 1.8–2.7% by weight |
| $Na_2O$: | 0.4–0.6% by weight |
| $K_2O$: | 1.5–2.1% by weight |

The mineral fibres of the invention can be manufactured in a coke-heated cupola furnace using a charge of, e.g., 25% by weight of lime and 75% by weight of briquettes. The briquettes are preferably manufactured of kaoline as matrix (60% by weight) added with bauxite (20% by weight) to raise the aluminum content, and iron silicate (20% by weight) to raise the iron content.

The kaoline briquettes melt at relatively low temperatures. First the iron silicate melts, then the kaoline, and finally this melt dissolves the bauxite. The final melt is formed by further dissolution of the lime in the charge, whereby a suitable viscosity for the removal from the cupola furnace and the subsequent spinning process is obtained.

When the briquettes are melted in a coke-heated cupola furnace, 13.7% by weight of coke is preferably used (relative to the weight of briquettes and lime) and air is supplied through the tuyeres of the furnace at a rate of 80–96 m³/min. to obtain a melting temperature of 1565°–1605° C. The melt which is removed through the melt outlet of the furnace may be supplied to a conventional rock wool fibre spinning apparatus and converted to a fibre web therein.

The invention will now be described in further detail with reference to the following example.

EXAMPLE

A series of fibre samples were manufactured in the process described above. Thereby fibre samples having the following composition were obtained.

|  | Sample No. | | | |
| --- | --- | --- | --- | --- |
|  | 1 | 2 | 3 | 4 |
| $SiO_2$, % by weight | 39.8 | 38.8 | 36.8 | 36.8 |
| $Al_2O_3$, % by weight | 34.4 | 33.9 | 33.9 | 34.9 |
| $TiO_2$, % by weight | 0.65 | 0.67 | 0.88 | 0.85 |
| FeO, % by weight | 2.5 | 3.3 | 4.4 | 4.2 |
| CaO, % by weight | 18.7 | 19.5 | 19.5 | 19.3 |
| MgO, % by weight | 2.05 | 1.9 | 2.6 | 2.0 |
| $Na_2O$, % by weight | 0.48 | 0.45 | 0.50 | 0.48 |
| $K_2O$, % by weight | 2.0 | 1.9 | 1.7 | 1.7 |
| MnO, % by weight | 0.05 | 0.05 | 0.07 | 0.06 |

The fibre samples manufactured were subjected to a heat stability test (AGI Q132, cf. DIN 52271 A81) at a heating rate of 5° K./min and at a load of 1.0 kN/m².

Hereby the following maximum temperatures of use (MTU) were determined:

| Sample No. | MTU |
| --- | --- |
| 1 | >850° C. (at a specific weight of 206 kg/m³) |
| 2 | 818° C. (at a specific weight of 91 kg/m³) |
| 3 | 815° C. (at a specific weight of 120 kg/m³) |
| 4 | 821° C. (at a specific weight of 111 kg/m³) |

I claim:

1. High temperature resistant mineral fibres consisting essentially of:

| | |
| --- | --- |
| $SiO_2$: | 34–42 % by weight |
| $Al_2O_3$: | 31–38 % by weight |
| $TiO_2$: | 0–1 % by weight |
| FeO: | 2.5–7.5 % by weight |
| CaO: | 17–21 % by weight |
| MgO: | 0.5–4.3 % by weight |
| $Na_2O$: | 0.3–1.5 % by weight |
| $K_2O$: | 0.1–2.3 % by weight |

2. High-temperature resistant mineral fibres according to claim 1, consisting essentially of:

| | |
| --- | --- |
| $SiO_2$: | 36–40% by weight |
| $Al_2O_3$: | 33–35% by weight |
| $TiO_2$: | 0.6–0.9% by weight |
| FeO: | 3.5–6.5% by weight |
| CaO: | 18–20% by weight |
| MgO: | 1.8–2.7% by weight |
| $Na_2O$: | 0.4–0.6% by weight |
| $K_2O$: | 1.5–2.1% by weight |

* * * * *